(12) United States Patent
Roh et al.

(10) Patent No.: US 12,540,114 B2
(45) Date of Patent: *Feb. 3, 2026

(54) SYSTEM OF PREPARING A PHTHALONITRILE-BASED COMPOUND AND METHOD OF PREPARING PHTHALONITRILE-BASED COMPOUND USING THE SAME

(71) Applicant: KOREA KUMHO PETROCHEMICAL CO., LTD., Seoul (KR)

(72) Inventors: Kee Yoon Roh, Daejeon (KR); Nam Hyun Cho, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 692 days.

This patent is subject to a terminal disclaimer.

(21) Appl. No.: 17/912,378

(22) PCT Filed: Oct. 18, 2021

(86) PCT No.: PCT/KR2021/014454
§ 371 (c)(1),
(2) Date: Sep. 16, 2022

(87) PCT Pub. No.: WO2022/092657
PCT Pub. Date: May 5, 2022

(65) Prior Publication Data
US 2023/0202969 A1     Jun. 29, 2023

(30) Foreign Application Priority Data
Oct. 30, 2020 (KR) .................. 10-2020-0143612

(51) Int. Cl.
C07C 253/02 (2006.01)
B01J 19/00 (2006.01)
B01J 19/24 (2006.01)

(52) U.S. Cl.
CPC ......... *C07C 253/02* (2013.01); *B01J 19/0006* (2013.01); *B01J 19/0013* (2013.01);
(Continued)

(58) Field of Classification Search
CPC .... B01J 19/00; B01J 19/0006; B01J 19/0013; B01J 19/24; B01J 19/245; B01J 2219/00;
(Continued)

(56) References Cited

U.S. PATENT DOCUMENTS

2023/0096729 A1* 3/2023 Roh ............... C07C 253/34
558/421

FOREIGN PATENT DOCUMENTS

CN   107011211 B   10/2018
CN   109761851 A    5/2019
(Continued)

OTHER PUBLICATIONS

Machine translation of KR 2015034420 A (Year: 2015).*
(Continued)

*Primary Examiner* — Natasha E Young
(74) *Attorney, Agent, or Firm* — Sughrue Mion, PLLC (57) ABSTRACT

The present disclosure relates a system of preparing a phthalonitrile-based compound using a continuous process, the preparation system including: a first reaction unit filled with a mixture including a phthalic acid-based compound and a nitrile-based compound; a second reaction unit connected to the first reaction unit; and a discharge unit connected to the second reaction unit, and in the second reaction unit, there is a fluid flow from the first reaction unit direction to the discharge unit direction, wherein the length of the (Continued)

second reaction unit in the fluid flow direction is 10 fold or more the mean square root of the cross-sectional area perpendicular to the fluid flow direction; and a method of preparing a phthalonitrile-based compound using the same.

15 Claims, 6 Drawing Sheets

(52) U.S. Cl.
CPC ...... *B01J 19/245* (2013.01); *B01J 2219/0004* (2013.01); *B01J 2219/00051* (2013.01); *B01J 2219/00162* (2013.01)

(58) Field of Classification Search
CPC .... B01J 2219/00002; B01J 2219/00027; B01J 2219/0004; B01J 2219/00049; B01J 2219/00051; B01J 2219/00162; C07C 253/00; C07C 253/02; C07C 253/30; C07C 255/00; C07C 255/01; C07C 255/02; C07C 255/04; Y02P 20/00; Y02P 20/50; Y02P 20/54
See application file for complete search history.

(56) References Cited

FOREIGN PATENT DOCUMENTS

| JP | 50-71643 A | | 6/1975 | |
| JP | 2012-082146 A | | 4/2012 | |
| KR | 2015034420 A | * | 4/2015 | ............. B01J 23/22 |
| RU | 2 192 411 C2 | | 11/2002 | |
| SU | 226 589 A1 | | 9/1968 | |

OTHER PUBLICATIONS

Ahmed Adeyemi, et al., "Continuous Flow Synthesis under High-Temperature/High-Pressure Conditions Using a Resistively Heated Flow Reactor", Organic Process Research & Development, 2017, vol. 21, pp. 947-955 (59 pages).

Cantillo, D. et al., "Direct preparation of nitriles from carboxylic acids in continuous flow." The Journal of organic chemistry, 2013, pp. 10567-10571, vol. 78, No. 20.

Khusnutdinov, R. I. et al., "Nitrilation of carboxylic acids with acetonitrile catalyzed by molybdenum and vanadium complexes", Russian Journal of Organic Chemistry, 2016, pp. 1282-1286, vol. 52, No. 9.

International Search Report for PCT/KR2021/014454 dated Feb. 15, 2022.

* cited by examiner

SYSTEM OF PREPARING A PHTHALONITRILE-BASED COMPOUND AND METHOD OF PREPARING PHTHALONITRILE-BASED COMPOUND USING THE SAME

CROSS REFERENCE TO RELATED APPLICATIONS

This application is a National Stage of International Application No. PCT/KR2021/014454, now WO 2022/092657, filed Oct. 18, 2021, claiming priority based on Korean Patent Application No. 10-2020-0143612 filed Oct. 30, 2020.

TECHNICAL FIELD

The present disclosure relates to a system of preparing a phthalonitrile-based compound and a method of preparing a phthalonitrile-based compound using the same.

BACKGROUND ART

Phthalonitrile-based compounds are important compounds used as intermediates in the preparation of fiber-forming linear polymers. In addition, phthalonitrile-based compounds are used as organic synthesis intermediates for various fine chemical products such as amines, acid-amides, and complex nitrogen dyes, and it is also a high value-added raw material used in plasticizers, alkyd resin modifiers, pesticides, etc.

Conventionally, a phthalonitrile-based compound was prepared by contacting and dehydrating a xylene compound with ammonia and an oxygen-containing gas in the presence of an oxidation catalyst. However, since this method uses ammonia gas, which is a harmful chemical, and is an ammoxidation reaction carried out in the presence of a catalyst at high temperature and high pressure, the process is complicated, and high-boiling point impurities must be purified and separated through distillation, so there is a problem that is difficult to remove by-products. In addition, in this conventional method of preparing a phthalonitrile-based compound, the yield of the product varies depending on the type of catalyst used in the ammoxidation reaction and the oxygen-containing gas ratio, and the conversion rate of the xylene compound as a precursor fluctuates with the reaction temperature, making it difficult to control the process.

Accordingly, there is an increasing demand for a process of preparing a high-purity phthalonitrile-based compound in an economical and environmentally friendly manner.

DISCLOSURE

Technical Problem

An object of the present disclosure is to provide a method for directly preparing a phthalonitrile compound from a phthalic acid-based compound in an environmentally friendly manner and a preparation system suitable therefor.

Technical Solution

According to one aspect, the present disclosure provides a system of preparing a phthalonitrile-based compound using a continuous process, the preparation system including: a first reaction unit filled with a mixture including a phthalic acid-based compound and a nitrile-based compound; a second reaction unit connected to the first reaction unit; and a discharge unit connected to the second reaction unit, and in the second reaction unit, there is a fluid flow from the first reaction unit direction to the discharge unit direction, wherein the length of the second reaction unit in the fluid flow direction is 10 fold or more the mean square root of the cross-sectional area perpendicular to the fluid flow direction.

In one embodiment, a pressure control unit may be further included between the first reaction unit and the second reaction unit.

In one embodiment, at least one of the first reaction unit, the second reaction unit, and the discharge unit may further include a temperature control unit.

In one embodiment, the capacity of the second reaction unit may be 1 to 50 parts by volume based on 100 parts by volume of the capacity of the first reaction unit.

In one embodiment, the flow rate of the fluid flow may be adjusted to a rate of 0.01 to 1.00 parts by volume/min of the capacity of the first reaction unit.

According to another aspect, the present disclosure provides a method of preparing a phthalonitrile-based compound in the method using the above-described preparation system, including: (a) adding a mixture including a phthalic acid-based compound and a nitrile-based compound to the first reaction unit; (b) reacting the mixture and transferring it to the second reaction unit; and (c) obtaining a phthalonitrile-based compound from the discharge unit, wherein (b) step is carried out under supercritical conditions of the nitrile-based compound.

In one embodiment, the phthalic acid-based compound may be isophthalic acid, terephthalic acid, or a mixture thereof.

In one embodiment, the nitrile-based compound may be one or more selected from the group consisting of hydrogen cyanide, acetonitrile, acrylonitrile, butyronitrile, isobutyronitrile, pivalonitrile, succinonitrile, fumaronitrile, crotonitrile and benzonitrile.

In one embodiment, the mixture of step (a) may be composed of a phthalic acid-based compound and a nitrile-based compound.

In one embodiment, in step (a), the content of the nitrile-based compound may be 1 to 500 parts by weight based on 1 part by weight of the phthalic acid-based compound.

In one embodiment, in step (a), the moisture content of the mixture may be less than 6,000 ppm.

In one embodiment, step (b) may be carried out under conditions of 260 to 350° C. and 40 to 200 bar.

In one embodiment, step (b) may be carried out for 1 to 500 minutes.

In one embodiment, step (c) may be a step of separating and purifying the phthalonitrile-based compound from the product obtained from the discharge unit.

In one embodiment, the residual compound separated in step (c) may be reused in step (a).

Advantageous Effects

According to one aspect, it is possible to directly prepare a phthalonitrile-based compound from a phthalic acid-based compound in an environmentally friendly manner.

According to another aspect, a method of preparing a phthalonitrile-based compound from a phthalic acid-based compound may be more efficiently carried out.

The effect of one aspect of the present specification is not limited to the above-described effect, but it should be

DETAILED DESCRIPTION OF THE PREFERRED EMBODIMENTS

Hereinafter, one aspect of the present specification will be described with reference to the accompanying drawings. However, the description of the present specification may be implemented in several different forms, and thus is not limited to the embodiments described herein. In order to clearly illustrate the present disclosure in the drawings, parts irrelevant to the description are omitted, and the same reference numerals are added to the same or similar parts throughout the specification.

Throughout the specification, when a part is "connected" with another part, this includes not only the case where it is "directly connected" but also the case where it is "indirectly connected" with another member interposed therebetween. In addition, when a part is said to "include" a component, this means that other components may be further included, not excluded, unless specifically stated to the contrary.

When a range of numerical values is recited herein, the values have the precision of the significant figures provided in accordance with the standard rules in chemistry for significant figures, unless the specific range is otherwise stated. For example, 10 includes the range of 5.0 to 14.9 and the number 10.0 includes the range of 9.50 to 10.49.

Hereinafter, one embodiment of the present disclosure will be described in detail with reference to the accompanying drawings.

System of Preparing a Phthalonitrile-Based Compound

According to one aspect, a system of preparing a phthalonitrile-based compound using a continuous process is provided, the preparation system includes a first reaction unit 100 filled with a mixture including a phthalic acid-based compound and a nitrile-based compound; a second reaction unit 200 connected to the first reaction unit; and a discharge unit 300 connected to the second reaction unit, and in the second reaction unit, there is a fluid flow from the first reaction unit 100 direction to the discharge unit direction 300, wherein the length of the second reaction unit 200 in the fluid flow direction is 10 fold or more the mean square root of the cross-sectional area perpendicular to the fluid flow direction.

The first reaction unit 100 may be a tank-type reactor, and may include a stirring means (not shown). In the first reaction unit 100, the reaction of the phthalic acid-based compound and the nitrile-based compound may be primarily initiated and carried out.

The phthalic acid-based compound may be a compound having an aromatic ring and two or more carboxyl groups. In one embodiment, the phthalic acid-based compound may be isophthalic acid, terephthalic acid, or a mixture thereof.

The nitrile-based compound may be at least one selected from the group consisting of hydrogen cyanide, acetonitrile, acrylonitrile, butyronitrile, isobutyronitrile, pivalonitrile, succinonitrile, fumaronitrile, crotonitrile and benzonitrile, however is not limited thereto. For example, when the nitrile-based compound is hydrogen cyanide, the reaction in the first reaction unit 100 and/or the second reaction unit 200 may be carried out at 183.5° C. or higher and 50 bar or higher. When the nitrile-based compound is acetonitrile, the reaction in the first reaction unit 100 and/or the second reaction unit 200 may be carried out at 272° C. or higher and 48.7 bar or higher. When the nitrile-based compound is acrylonitrile, the reaction in the first reaction unit 100 and/or the second reaction unit 200 may be carried out at 267° C. or higher and 46 bar or higher. When the nitrile-based compound is butyronitrile, the reaction in the first reaction unit 100 and/or the second reaction unit 200 may be carried out at 309° C. or higher and 37.8 bar or higher. When the nitrile-based compound is isobutyronitrile, the reaction in the first reaction unit 100 and/or the second reaction unit 200 may be carried out at 336° C. or higher and 40 bar or higher. When the nitrile-based compound is pivalonitrile, the reaction in the first reaction unit 100 and/or the second reaction unit 200 may be carried out at 343° C. or higher and 34.4 bar or higher. In addition, the reaction conditions in the first reaction unit 100 and/or the second reaction unit 200 may be changed according to the type of the nitrile-based compound. Accordingly, all of the above conditions are exemplary and do not limit the scope of the disclosure. The nitrile-based compound may be both a solvent and a reactant.

The second reaction unit 200 may be a type of tubular reactor in which the length in the fluid flow direction has a larger value compared to the direction perpendicular to the fluid flow direction. In FIGS. 3 to 6, the fluid flow direction, which is indicated by the second reaction unit 200 and the thin solid line arrow, is shown in a straight line, but is not limited to this, and the fluid flow direction and the second reaction unit 200 may be a curve such as a coil in addition to the straight line.

In the present specification, the length of the second reaction unit 200 means a distance through which the fluid flows from one end connected to the first reaction unit 100 to the other end connected to the discharge unit 300.

In the present specification, the cross-sectional area of the second reaction unit 200 means an area perpendicular to the flow direction of the fluid.

In the present specification, "mean square root of the cross-sectional area" may mean a square root value of the cross-sectional area when the cross-sectional area of the second reaction unit 200 does not change depending on the location, and when the cross-sectional area of the second reaction unit 200 changes depending on the location, it may be an $S_{sqrt}$ value calculated according to the following equation.

$$S_{sqrt} = \frac{\int_0^L \sqrt{A(x)}\,dx}{L} \quad \text{[Equation]}$$

wherein L is the length of the second reaction unit 200, and A(x) is cross-sectional area value according to the point (x) from one end (0) connected to the first reaction unit 100 to the other end (L) connected to the discharge unit 300, and $S_{sqrt}$ means the mean square root value of the cross-sectional area.

The length of the second reaction unit 200 may be 10 fold or more, for example, 10 fold, 15 fold, 20 fold, 25 fold, 30 fold, 35 fold, 40 fold, 45 fold, 50 fold, 55 fold, 60 fold, 65 fold, 70 fold, 75 fold, 80 fold, 85 fold, 90 fold, 95 fold, 100 fold, 105 fold, 110 fold, 115 fold, 120 fold, 125 fold, 130 fold, 135 fold, 140 fold, 145 fold, 150 fold, 155 fold, 160 fold, 165 fold, 170 fold, 175 fold, 180 fold, 185 fold, 190 fold, 195 fold, 200 fold, 205 fold, 210 fold, 215 fold, 220 fold, 225 fold, 230 fold, 235 fold, 240 fold, 245 fold, 250 fold, 255 fold, 260 fold, 265 fold, 270 fold, 275 fold, 280 fold, 285 fold, 290 fold, 295 fold, 300 fold, 305 fold, 310 fold, 315 fold, 320 fold, 325 fold, 330 fold, 335 fold, 340 fold, 345 fold, 350 fold, 355 fold, 360 fold, 365 fold, 370 fold, 375 fold, 380 fold, 385 fold, 390 fold, 395 fold, 400 fold, 405 fold, 410 fold, 415 fold, 420 fold, 425 fold, 430 fold, 435 fold, 440 fold, 445 fold, 450 fold, 455 fold, 460 fold, 465 fold, 470 fold, 475 fold, 480 fold, 485 fold, 490 fold, 495 fold, 500 fold, 505 fold, 510 fold, 515 fold, 520 fold, 525 fold, 530 fold, 535 fold, 540 fold, 545 fold, 550 fold, 555 fold, 560 fold, 565 fold, 570 fold, 575 fold, 580 fold, 585 fold, 590 fold, 595 fold, 600 fold, 605 fold, 610 fold, 615 fold, 620 fold, 625 fold, 630 fold, 635 fold, 640 fold, 645 fold, 650 fold, 655 fold, 660 fold, 665 fold, 670 fold, 675 fold, 680 fold, 685 fold, 690 fold, 695 fold, 700 fold, 715 fold, 720 fold, 725 fold, 730 fold, 735 fold, 740 fold, 745 fold, 750 fold, 755 fold, 760 fold, 765 fold, 770 fold, 775 fold, 780 fold, 785 fold, 790 fold, 795 fold, 800 fold, 805 fold, 810 fold, 815 fold, 820 fold, 825 fold, 830 fold, 835 fold, 840 fold, 845 fold, 850 fold, 855 fold, 860 fold, 865 fold, 870 fold, 875 fold, 880 fold, 885 fold, 890 fold, 895 fold, 900 fold, 905 fold, 910 fold, 915 fold, 920 fold, 925 fold, 930 fold, 935 fold, 940 fold, 945 fold, 950 fold, 955 fold, 960 fold, 965 fold, 970 fold, 975 fold, 980 fold, 985 fold, 990 fold, 995 fold, 1,000 fold, a range between two of these values or 1,000 fold or more of a mean square root value of the cross-sectional area, and may be 10 to 1,000 fold as one example, but is not limited thereto.

When the length of the second reaction unit 200 is out of the above range, the purity of the product may be reduced due to insufficient control of fluctuations in reaction temperature and/or reaction pressure, or productivity may decrease due to excessive time required for the process.

Figure 3:
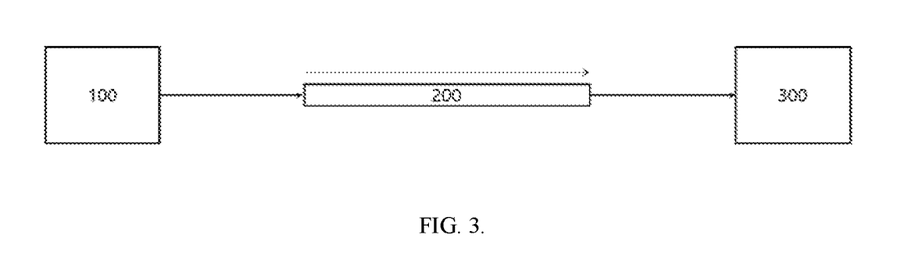
FIG. 3 schematically shows a system for preparing a phthalonitrile-based compound according to an embodiment of the present specification.

FIG. 3 is a schematic diagram of a system of preparing such a phthalonitrile-based compound, and the reaction is carried out by connecting the second reaction unit 200, which is a tubular reactor, to the first reaction unit 100, which is a tank type reactor, and by obtaining the product from the discharge unit 300, it is possible to improve the problem that the purity of the product is lowered due to fluctuations in the reaction temperature and/or reaction pressure. The first reaction unit 100 and the second reaction unit 200 may use a valve (not shown) such as a flow meter to adjust the input amount (flow rate) of the mixture to the second reaction unit 200.

Figure 4:
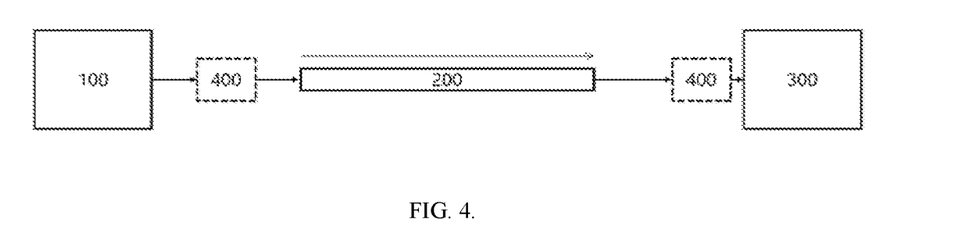
FIG. 4 schematically shows a system for preparing a phthalonitrile-based compound according to another embodiment of the present specification.

Referring to FIG. 4, which is another example of a system of preparing the phthalonitrile-based compound, a pressure control unit 400 may be further included between the first reaction unit 100 and the second reaction unit 200 and/or between the second reaction unit 200 and the discharge unit 300. When the pressure control unit 400 is further included, the reaction pressure can be more precisely controlled.

Figure 5:
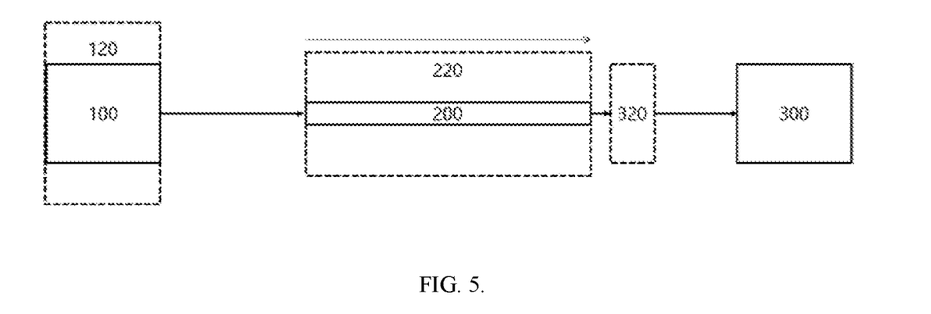
FIG. 5 schematically shows a system for preparing a phthalonitrile-based compound according to another embodiment of the present specification.

Referring to FIG. 5, which is another example of a system of preparing the phthalonitrile-based compound, at least one of the first reaction unit 100, the second reaction unit 200, and the discharge unit 300 may further include a temperature control unit 120, 220, or 320. The temperature control unit 120 or 220 of the first reaction unit 100 or the second reaction unit 200 are wrapped around each reaction unit 100 and 200 to help maintain a high reaction temperature, and the temperature control unit 320 of the discharge unit 300 may be located at the front end of the discharge unit 300 and may be used to cool the product, but is not limited thereto.

Figure 6:
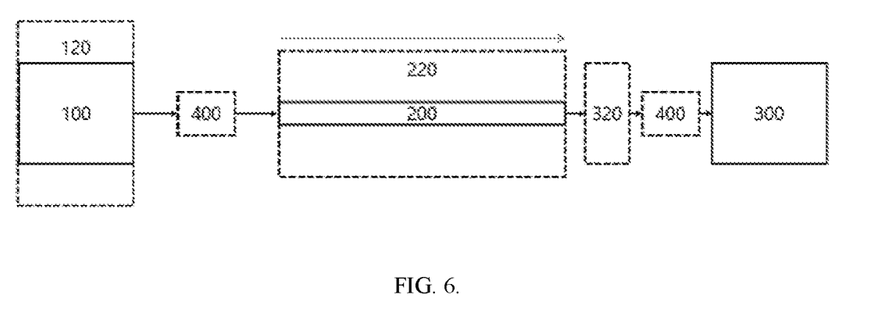
FIG. 6 schematically shows a system for preparing a phthalonitrile-based compound according to another embodiment of the present specification.

Referring to FIG. 6, which is another example of the system of preparing the phthalonitrile-based compound, at least one of the above-described temperature control units 120, 220 and 320 and at least one pressure control unit 400 may be included. The positions of the temperature control unit 320 and the pressure control unit 400 may be interchanged.

The capacity of the second reaction unit 200 may be 1 to 50 parts by volume, for example, 1 part by volume, 5 parts by volume, 10 parts by volume, 15 parts by volume, 20 parts by volume, 25 parts by volume, 30 parts by volume, 35 parts by volume, 40 parts by volume, 45 parts by volume, 50 parts by volume based on 100 parts by volume of the capacity of the first reaction unit 100 or a range between two of these values, but is not limited thereto. When the capacity of the second reaction unit 200 is excessively large compared to that of the first reaction unit 100, process efficiency may decrease, and when it is excessively small, the effect of improving product purity by reaction condition control may be insufficient.

The flow rate of the fluid flow may be controlled to a rate of 0.01 to 1.00 parts by volume/min, for example, 0.01 parts by volume/min, 0.05 parts by volume/min, 0.10 parts by volume/min, 0.15 parts by volume/min, 0.20 parts by volume/min, 0.25 parts by volume/min, 0.30 parts by volume/min, 0.35 parts by volume/min, 0.40 parts by volume/min, 0.45 parts by volume/min, 0.50 parts by volume/min, 0.55 parts by volume/min, 0.60 parts by volume/min, 0.65 parts by volume/min, 0.70 parts by volume/min, 0.75 parts by volume/min, 0.80 parts by volume/min, 0.85 parts by volume/min, 0.90 parts by volume/min, 0.95 parts by volume/min, 1.00 parts by volume/min of the first reaction unit 100 capacity or a range between two of these values. When the flow rate of the fluid flow is out of the above range, the reaction time may be excessively lengthened to decrease process efficiency, or the reaction time may be excessively shortened to reduce the purity of the product.

Method of Preparing Phthalonitrile-Based Compound

According to another aspect, there is provided a method of preparing a phthalonitrile-based compound using the above-described preparation system the method including (a) adding a mixture including a phthalic acid-based compound and a nitrile-based compound to the first reaction unit 100; (b) reacting the mixture and transferring it to the second reaction unit 200; and (c) obtaining a phthalonitrile-based compound from the discharge unit 300, wherein the (b) step may be carried out under supercritical conditions of the nitrile-based compound.

In the preparation method, for example, after introducing the mixture to the first reaction unit 100, the temperature is raised to 275 to 285° C., and when the reaction pressure of 90 to 95 bar is reached, the mixture is reacted while stirring for a certain period of time, and it may be transferred to the reaction unit 200 and further reacted to obtain a phthalonitrile-based compound from the discharge unit 300, but is not limited thereto.

The phthalic acid-based compound and the nitrile-based compound are the same as described above, and the reaction temperature of step (b) may be adjusted according to the type of the nitrile-based compound. For example, when the nitrile-based compound is hydrogen cyanide, step (b) may be carried out at 183.5° C. or higher and 50 bar or higher. When the nitrile-based compound is acetonitrile, step (b) may be carried out at 272° C. or higher and 48.7 bar or higher. When the nitrile-based compound is acrylonitrile, step (b) may be carried out at 267° C. or higher and 46 bar or higher. When the nitrile-based compound is butyronitrile, step (b) may be carried out at 309° C. or higher and 37.8 bar or higher. When the nitrile-based compound is isobutyronitrile, step (b) may be carried out at 336° C. or higher and 40 bar or higher. When the nitrile-based compound is pivalonitrile, step (b) may be carried out at 343° C. or higher and 34.4 bar or higher. In addition, the conditions of step (b) may be changed according to the type of the nitrile-based compound. Accordingly, all of the above conditions are exemplary and do not limit the scope of the disclosure. The nitrile-based compound may be both a solvent and a reactant.

In step (a), the content of the nitrile-based compound may be 1 to 500 parts by weight based on 1 part by weight of the phthalic acid-based compound. For example, the content of the nitrile-based compound may be 1 part by weight, 5 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, 100 parts by weight, 105 parts by weight, 110 parts by weight, 115 parts by weight, 120 parts by weight, 125 parts by weight, 130 parts by weight, 135 parts by weight, 140 parts by weight, 145 parts by weight, 150 parts by weight, 155 parts by weight, 160 parts by weight, 165 parts by weight, 170 parts by weight, 175 parts by weight, 180 parts by weight, 185 parts by weight, 190 parts by weight, 195 parts by weight, 200 parts by weight, 205 parts by weight, 210 parts by weight, 215 parts by weight, 220 parts by weight, 225 parts by weight, 230 parts by weight, 235 parts by weight, 240 parts by weight, 245 parts by weight, 250 parts by weight, 255 parts by weight, 260 parts by weight, 265 parts by weight, 270 parts by weight, 275 parts by weight, 280 parts by weight, 285 parts by weight, 290 parts by weight, 295 parts by weight, 300 parts by weight, 305 parts by weight, 310 parts by weight, 315 parts by weight, 320 parts by weight, 325 parts by weight, 330 parts by weight, 335 parts by weight, 340 parts by weight, 345 parts by weight, 350 parts by weight, 355 parts by weight, 360 parts by weight, 365 parts by weight, 370 parts by weight, 375 parts by weight, 380 parts by weight, 385 parts by weight, 390 parts by weight, 395 parts by weight, 400 parts by weight, 405 parts by weight, 410 parts by weight, 415 parts by weight, 420 parts by weight, 425 parts by weight, 430 parts by weight, 435 parts by weight, 440 parts by weight, 445 parts by weight, 450 parts by weight, 455 parts by weight, 460 parts by weight, 465 parts by weight, 470 parts by weight, 475 parts by weight, 480 parts by weight, 485 parts by weight, 490 parts by weight, 495 parts by weight, 500 parts by weight based on 1 part by weight of the phthalic acid-based compound or a range between two of these values. As the content of the nitrile-based compound increases as compared to the content of the phthalic acid-based compound, the purity of the product may increase, however, an excessive amount of the nitrile-based compound may be economically disadvantageous.

In one embodiment, in step (a), the moisture content of the mixture may be less than 6,000 ppm. For example, the water content of the mixture may be less than 6,000 ppm, less than 5,000 ppm, less than 4,000 ppm, less than 3,000 ppm, less than 2,000 ppm, less than 1,000 ppm, less than 750 ppm, less than 500 ppm or less than 250 ppm. The lower the moisture content of the mixture, the higher the purity of the product.

The reaction of step (b) may be di-nitrilation through a direct substitution reaction of a carboxyl group and a nitrile group, and an example thereof may be expressed as the following reaction scheme.

wherein, R is an aromatic ring such as phenylene, and R' may be an alkyl group having 1 to 20 carbon atoms, for example, a methyl group, an ethyl group, an isopropyl group, a t-butyl group, etc.

In step (b), the reaction temperature is raised according to the above-described range, and the pressures of the first reaction unit 100, the second reaction unit 200, and the discharge unit 300 are adjusted within the range of above-described reaction pressure to carry out the reaction and transfer.

In step (b), the reaction may be carried out without the mixture including a separate additive such as ammonia, high concentration oxygen, or a catalyst. Since the reaction of step (b) may be carried out without a separate additive, the mixture of step (a) may be composed of a phthalic acid-based compound and a nitrile-based compound, but is not limited thereto. For example, the mixture may be a solid phthalic acid-based compound dissolved in a nitrile-based compound solvent, but is not limited thereto.

When the temperature and pressure conditions in step (b) are above the critical point of the nitrile-based compound, the reaction may be carried out. Step (b) may be carried out under conditions of 260 to 350° C., and 40 to 200 bar. For example, in step (b), the reaction temperature may be 260° C., 265° C., 270° C., 275° C., 280° C., 285° C., 290° C., 295° C., 300° C., 305° C., 310° C., 315° C., 320° C., 325° C., 330° C., 335° C., 340° C., 345° C., 350° C., or a range between two of these values. For example, in step (b), the reaction pressure may be 40 bar, 45 bar, 50 bar, 55 bar, 60 bar, 65 bar, 70 bar, 75 bar, 80 bar, 85 bar, 90 bar, 95 bar, 100 bar, 105 bar, 110 bar, 115 bar, 120 bar, 125 bar, 130 bar, 135 bar, 140 bar, 145 bar, 150 bar, 155 bar, 160 bar, 165 bar, 170 bar, 175 bar, 180 bar, 185 bar, 190 bar, 195 bar, 200 bar, or a range between two of these values. When the reaction temperature in step (b) is excessively low, the purity of the product may decrease or the reaction may not be carried out, and when the reaction temperature is excessively high, the generation of by-products may increase and the purity may decrease. When the reaction pressure in step (b) is excessively low, the reaction may not be carried out, and when the reaction pressure is excessively high, safety may deteriorate.

When the system of preparing the phthalonitrile-based compound is used, the purity of the final product is high by more precisely controlling the reaction temperature and pressure, and the total reaction time can be lowered, so that productivity can be excellent.

Step (b) may be carried out for 1 to 500 minutes. For example, step (b) may be carried out for 1 min, 5 min, 10 min, 15 min, 20 min, 25 min, 30 min, 35 min, 40 min, 45 min, 50 min, 55 min, 60 min, 65 min, 70 min, 75 min, 80 min, 85 min, 90 min, 95 min, 100 min, 105 min, 110 min, 115 min, 120 min, 125 min, 130 min, 135 min, 140 min, 145 min, 150 min, 155 min, 160 min, 165 min, 170 min, 175 min, 180 min, 185 min, 190 min, 195 min, 200 min, 205 min, 210 min, 215 min, 220 min, 225 min, 230 min, 235 min, 240 min, 245 min, 250 min, 255 min, 260 min, 265 min, 270 min, 275 min, 280 min, 285 min, 290 min, 295 min, 300 min, 305 min, 310 min, 315 min, 320 min, 325 min, 330 min, 335 min, 340 min, 345 min, 350 min, 355 min, 360 min, 365 min, 370 min, 375 min, 380 min, 385 min, 390 min, 395 min, 400 min, 405 min, 410 min, 415 min, 420 min, 425 min, 430 min, 435 min, 440 min, 445 min, 450 min, 455 min, 460 min, 465 min, 470 min, 475 min, 480 min, 485 min, 490 min, 495 min or 500 min, including intermediate ranges thereof. As the reaction time in step (b) increases, the purity of the product may increase, but when the reaction time is excessively long, productivity may decrease.

Step (c) may be a step of separating and purifying the phthalonitrile-based compound from the product obtained from the discharge unit 300. The separation and purification may be separation into a phthalonitrile-based compound and a residual compound, and may be carried out according to various known methods such as distillation separation. The residual compound may include, for example, one or more selected from the group consisting of unreacted phthalic acid-based compounds, unreacted nitrile-based compounds, and phthalic acid-nitrile-based compounds in which only a portion of the carboxyl groups of the phthalic acid-based compounds have been reacted, but is not limited thereto.

The residual compounds other than the phthalonitrile-based compound separated in step (c) may be reused in step (a). The method of preparing a phthalonitrile-based compound according to an embodiment of the present specification can be carried out without the use of a separate additive such as a catalyst, so that the residual compound can be reused without separate purification.

The method of preparing the phthalonitrile-based compound using the system of preparing the phthalonitrile-based compound may have a product purity of 60% or more, 65% or more, 70% or more, 75% or more, 80% or more, 85% or more, 90% or more or 95% or more.

Hereinafter, examples of the present specification will be described in more detail. However, the following experimental results describe only representative experimental results among the above examples, and the scope and content of the present specification may not be construed as reduced or limited by the examples. Each effect of the various embodiments of the present specification not explicitly presented below will be specifically described in the corresponding section.

Reactor

First Reactor: A tank-type reactor with a capacity of 100 parts by volume equipped with a stirrer Second Reactor: A tubular reactor with a capacity of 6 parts by volume having a length of 670 fold the mean square root of the cross-sectional area Comparative Example 1

5 parts by weight of isophthalic acid (IPA) and 100 parts by weight of acetonitrile (ACN) were introduced to the first reactor equipped with a stirrer to form a reaction system. Nitrogen was substituted three times at a pressure of 2 to 3 bar in the interior of the first reactor. The first reactor was stirred at 400 rpm at atmospheric pressure, and the internal temperature was raised to 290° C. The reaction was carried out for 1 to 4 hours while maintaining the reaction temperature, and the reaction pressure was 90 to 95 bar. After the reaction was completed, the reaction system was cooled to room temperature. Thereafter, the reaction system was distilled under reduced pressure to separate acetonitrile and isophthalonitrile (IPN). Acetonitrile was reused, and isophthalonitrile was analyzed by gas chromatography to confirm the purity of the product.

Comparative Example 2

5 parts by weight of terephthalic acid (TPA) and 100 parts by weight of acetonitrile were introduced to the first reactor equipped with a stirrer to form a reaction system. Nitrogen was substituted three times at a pressure of 2 to 3 bar in the interior of the first reactor. The first reactor was stirred at 400 rpm at atmospheric pressure, and the internal temperature was raised to 290° C. The reaction was carried out for 1 to 4 hours while maintaining the reaction temperature, and the reaction pressure was 90 to 95 bar. After the reaction was completed, the reaction system was cooled to room temperature. Thereafter, the reaction system was distilled under reduced pressure to separate acetonitrile and terephthalonitrile (TPN). Acetonitrile was reused, and terephthalonitrile was analyzed by gas chromatography to confirm the purity of the product.

Example 1

5 parts by weight of isophthalic acid and 100 parts by weight of acetonitrile were introduced to the first reactor equipped with a stirrer. Nitrogen was substituted three times at a pressure of 2 to 3 bar in the interior of the first reactor. The first reactor was stirred at 150 rpm, and the internal temperature of the first reactor and the second reactor was raised to 275 to 285° C. After reacting for 1 hour while maintaining the reaction temperature of 275 to 285° C. and a reaction pressure of 90 to 95 bar, the reactants were transferred to the second reactor while controlling the pressure and flow rate. The purity of the product obtained at the end of the second reactor was confirmed by gas chromatography analysis at intervals of 30 minutes.

Example 2

5 parts by weight of terephthalic acid and 100 parts by weight of acetonitrile were introduced to the first reactor equipped with a stirrer. Nitrogen was substituted three times at a pressure of 2 to 3 bar in the interior of the first reactor. The first reactor was stirred at 150 rpm, and the internal temperature of the first reactor and the second reactor was raised to 180 to 300° C. After reacting for 1 hour while maintaining the reaction temperature of 280 to 300° C. and a reaction pressure of 70 to 100 bar, the reactants were transferred to the second reactor while controlling the pressure and flow rate. The purity of the product obtained at the end of the second reactor was confirmed by gas chromatography analysis at intervals of 30 minutes.

The reaction conditions and product purity of the Comparative Examples and Examples are summarized in Table 1 below. In addition, the gas chromatography result of the product prepared according to Comparative Example 1-2 is shown in FIG. 1, and the gas chromatography result of the product prepared according to Example 1-2 is shown in FIG. 2.

harmful compounds such as ammonia and acid catalysts, in one embodiment of the present disclosure, a phthalonitrile-based compound may be prepared in high yield from the phthalic acid-based compound without a separate catalyst or additive input. In addition, a product of higher purity can be prepared with a shorter reaction time as compared to Comparative Examples in which a batch reaction is carried out using a continuous process.

Figure 1:
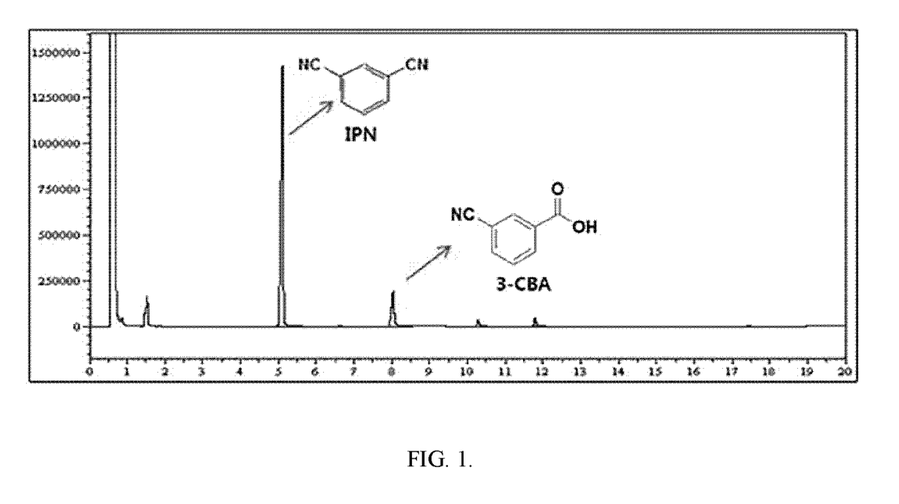
FIG. 1 is a gas chromatography result of a product prepared according to Comparative Example 1-2 of the present specification.
Figure 2:
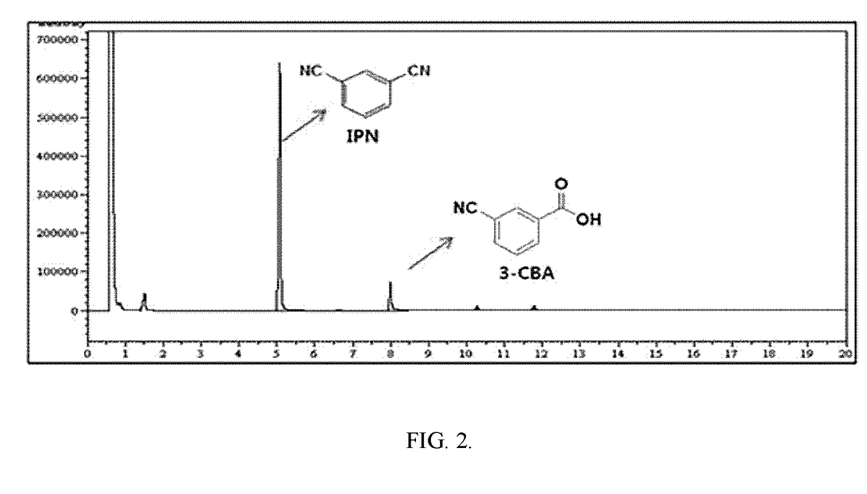
FIG. 2 is a gas chromatography result of a product prepared according to Example 1-2 of the present specification.

In addition, referring to FIGS. 1 and 2, unlike the Comparative Example in which 15 to 20 wt % of the intermediate

TABLE 1

|  | IPA (part by weight) | TAP (part by weight) | ACN (part by weight) | Stirring Rate (rpm) | Reaction Temperature (° C.) | Reaction Pressure (bar) | Reaction Time (hr) | Purity (%) |
| --- | --- | --- | --- | --- | --- | --- | --- | --- |
| Comp. Ex. 1-1 | 5 | 0 | 100 | 400 | 290 | 90-95 | 1 | 68.0 |
| Comp. Ex. 1-2 | 5 | 0 | 100 | 400 | 280 | 90-95 | 4 | 76.3 |
| Comp. Ex. 1-3 | 5 | 0 | 100 | 400 | 290 | 90-95 | 4 | 79.9 |
| Comp. Ex. 1-4 | 5 | 0 | 100 | 400 | 290 | 90-95 | 6 | 81.8 |
| Comp. Ex. 2-1 | 0 | 5 | 100 | 400 | 280 | 75-80 | 4 | 82.5 |
| Comp. Ex. 2-2 | 0 | 5 | 100 | 400 | 290 | 90-95 | 4 | 86.9 |
| Comp. Ex. 2-3 | 0 | 5 | 100 | 400 | 290 | 90-95 | 6 | 88.1 |
| Ex. 1-1 | 5 | 0 | 100 | 150 | 275 | 90-95 | 2 | 72.1 |
| Ex. 1-2 | 5 | 0 | 100 | 150 | 280 | 90-95 | 2 | 79.4 |
| Ex. 1-3 | 5 | 0 | 100 | 150 | 285 | 90-95 | 0.5 | 75.9 |
| Ex. 1-4 | 5 | 0 | 100 | 150 | 285 | 90-95 | 1 | 80.1 |
| Ex. 1-5 | 5 | 0 | 100 | 150 | 285 | 90-95 | 1.5 | 81.6 |
| Ex. 1-6 | 5 | 0 | 100 | 150 | 285 | 90-95 | 2 | 82.8 |
| Ex. 1-7 | 5 | 0 | 100 | 150 | 285 | 90-95 | 2.5 | 83.9 |
| Ex. 1-8 | 5 | 0 | 150 | 150 | 280 | 90-95 | 2 | 88.4 |
| Ex. 2-1 | 0 | 5 | 100 | 150 | 280 | 90-95 | 2 | 90.1 |
| Ex. 2-2 | 0 | 5 | 100 | 150 | 285 | 90-95 | 2.5 | 92.6 |
| Ex. 2-3 | 0 | 5 | 150 | 150 | 285 | 90-95 | 2 | 95.8 |

Ex.: Example
Comp. Ex.: Comparative Example

When comparing Comparative Example 1, which is a batch process using the first reactor, with Example 1 which is a continuous process using the first reactor and the second reactor, although the reaction time of Example 1 is only half of that of Comparative Example 1 with the same reactants and at the same reaction temperature, it can be confirmed that purity is higher.

In addition, when comparing Example 2 in which terephthalonitrile was prepared in a continuous process with Comparative Example 2 in which terephthalonitrile was prepared in a batch process, it can be confirmed that the preparation of terephthalonitrile of higher purity with only half to 63% reaction time is possible.

Referring to Example 1-1, Example 1-2, and Example 1-6, the higher the reaction temperature, the higher the purity of the product, and at a reaction temperature of 275° C., some unreacted isophthalic acid was detected.

Referring to Examples 1-3 to 1-7, as the reaction time increases, the purity of the product increases, and a high-purity product could be prepared even in a shorter reaction time compared to a batch reaction.

Referring to Examples 1-2 and 1-8, as compared with the nitrile-based compound, it can be confirmed that the higher the content of the phthalic acid-based compound, the higher the purity of the product.

Referring to Examples 1 and 2, unlike the conventional preparation process using an ammoxidation reaction using (3-CBA) remains, in the example, the residual intermediate (3-CBA) was reduced to less than half.

Specifically, in the above example, isophthalic acid or terephthalic acid, which is a phthalic acid-based compound, was used as a reactant, and acetonitrile, an organic nitrile, was used as a solvent and a reactant. The mixture of these is heated directly without a separate catalyst or adduct to form a high-temperature, high-pressure supercritical state ($T_c$: 275° C. or higher, $P_c$: 48 bar or higher) and induce an exchange reaction between the acid and nitrile to directly generate a phthalonitrile-based compound. In addition, a high-purity product was prepared in a shorter time by performing the reaction separately in a tank-type reactor and a tubular reactor. As a result, purification and separation of the final product were easier.

The description of the present specification described above is for illustration, and it should be understood that those of ordinary skill in the art to which one aspect of the present specification belongs can easily transform it into other specific forms without changing the technical idea or essential features described in this specification. Therefore, it should be understood that the embodiments described above are illustrative in all respects and not restrictive. For example, each component described as a single type may be implemented in a dispersed form, and likewise components described as distributed may be implemented in a combined form.

The scope of the present specification is indicated by the following claims, and all changes or modifications derived from the meaning and scope of the claims and their equivalents should be construed as being included in the scope of the present specification.

DESCRIPTION OF MARKS IN THE FIGURES

100: first reaction unit
200: second reaction unit
300: discharge unit
120, 220, 320: temperature control unit
400: pressure control unit

The invention claimed is:

1. A system of preparing a phthalonitrile-based compound using a continuous process, the preparation system comprising:
a first reaction unit filled with a mixture including a phthalic acid-based compound and a nitrile-based compound;
a second reaction unit connected to the first reaction unit; and
a discharge unit connected to the second reaction unit;
wherein, in the second reaction unit, there is a fluid flow from the first reaction unit direction to the discharge unit direction,
wherein the length of the second reaction unit in the fluid flow direction is 10 fold or more a mean square root of a cross-sectional area perpendicular to the fluid flow direction.

2. The system of claim 1, further comprising a pressure control unit between the first reaction unit and the second reaction unit.

3. The system of claim 1, wherein at least one of the first reaction unit, the second reaction unit, and the discharge unit further comprises a temperature control unit.

4. The system of claim 1, wherein the capacity of the second reaction unit is 1 to 50 parts by volume based on 100 parts by volume of the first reaction unit.

5. The system of claim 1, wherein the flow rate of the fluid flow is adjusted to a rate of 0.01 to 1.00 parts by volume/min of a capacity of the first reaction unit.

6. A method using the preparation system according to claim 1, comprising:
(a) adding a mixture including a phthalic acid-based compound and a nitrile-based compound to the first reaction unit;
(b) reacting the mixture and transferring it to the second reaction unit; and
(c) obtaining a phthalonitrile-based compound from the discharge unit;
wherein step (b) is carried out under supercritical conditions of the nitrile-based compound.

7. The method of claim 6, wherein the phthalic acid-based compound is isophthalic acid, terephthalic acid, or a mixture thereof.

8. The method of claim 6, wherein the nitrile-based compound is one or more selected from the group consisting of hydrogen cyanide, acetonitrile, acrylonitrile, butyronitrile, isobutyronitrile, pivalonitrile, succinonitrile, fumaronitrile, crotonitrile and benzonitrile.

9. The method of claim 6, wherein the mixture of step (a) consists of a phthalic acid-based compound and a nitrile-based compound.

10. The method of claim 6, wherein in step (a), the content of the nitrile-based compound is 1 to 500 parts by weight based on 1 part by weight of the phthalic acid-based compound.

11. The method of claim 6, wherein in step (a), the moisture content of the mixture is less than 6,000 ppm.

12. The method of claim 6, wherein step (b) is carried out under the conditions of 260 to 350° C. and 40 to 200 bar.

13. The method of claim 6, wherein step (b) is carried out for 1 to 500 minutes.

14. The method of claim 6, wherein step (c) is a step of separating and purifying a phthalonitrile-based compound from the product obtained from the discharge unit.

15. The method of claim 14, wherein the residual compound separated in step (c) is reused in step (a).

* * * * *